(12) United States Patent
Rohrbach et al.

(10) Patent No.: US 9,623,350 B2
(45) Date of Patent: Apr. 18, 2017

(54) EXTENDED-LIFE OIL MANAGEMENT SYSTEM AND METHOD OF USING SAME

(71) Applicant: Fram Group IP LLC, Lake Forest, IL (US)

(72) Inventors: Ronald P. Rohrbach, Flemington, NJ (US); Gerard W. Bilski, Perrysburg, OH (US); Brian Artz, Maumee, OH (US)

(73) Assignee: FRAM GROUP IP LLC, Lake Forest, IL (US)

( * ) Notice: Subject to any disclaimer, the term of this patent is extended or adjusted under 35 U.S.C. 154(b) by 314 days.

(21) Appl. No.: 14/180,514

(22) Filed: Feb. 14, 2014

(65) Prior Publication Data
US 2014/0246380 A1 Sep. 4, 2014

Related U.S. Application Data

(60) Provisional application No. 61/771,430, filed on Mar. 1, 2013.

(51) Int. Cl.
*B01D 35/00* (2006.01)
*B01D 37/02* (2006.01)
(Continued)

(52) U.S. Cl.
CPC ......... *B01D 35/005* (2013.01); *B01D 37/025* (2013.01); *B01D 37/04* (2013.01);
(Continued)

(58) Field of Classification Search
CPC .... B01D 35/005; B01D 37/025; B01D 37/04; B01D 37/041; F01M 2001/1014;
(Continued)

(56) References Cited

U.S. PATENT DOCUMENTS 2,262,526 A  11/1941 Fairlie et al.
2,310,305 A   2/1943 Miller et al.
(Continued)

FOREIGN PATENT DOCUMENTS

DE   157197    10/1982
DE   4200376    7/1993
(Continued)

OTHER PUBLICATIONS

Supplementary European Search Report dated Mar. 1, 2011.
(Continued)

*Primary Examiner* — Lucas Stelling
(74) *Attorney, Agent, or Firm* — Elizabeth A. Peters; Barnes & Thornburg LLP

(57) ABSTRACT

An oil management system to reduce and remove the amount of soot, rust or other contaminating particles in oil used in an engine, the oil management system comprising an oil filter assembly including a filter element and an additive cartridge, the additive cartridge configured to provide a means for continuously dispersing a small quantity of additive into the oil; an oxidation prevention means to prevent or diminish oxidation of metal in the oil management system; and an oil condition monitoring sensor to measure various aspects of the oil in the oil management system.

29 Claims, 13 Drawing Sheets

(51) Int. Cl.
*B01D 37/04* (2006.01)
*F01M 1/10* (2006.01)
*F01M 11/10* (2006.01)
*F01M 9/02* (2006.01)
*F01M 11/00* (2006.01)

(52) U.S. Cl.
CPC .............. *B01D 37/041* (2013.01); *F01M 9/02* (2013.01); *F01M 11/10* (2013.01); *F01M 2001/1014* (2013.01); *F01M 2011/0091* (2013.01); *F01M 2011/1466* (2013.01)

(58) Field of Classification Search
CPC ............. F01M 2011/0091; F01M 9/02; F01M 2011/1014; F01M 2011/1406; F01M 2011/1413; F01M 2011/142; F01M 2011/1426; F01M 2011/1433; F01M 2011/144; F01M 2011/1446; F01M 2011/1453; F01M 2011/146; F01M 2011/1466; F01M 2011/1473; F01M 2011/148; F01M 2011/1486; F01M 2011/1493
See application file for complete search history.

(56) References Cited

U.S. PATENT DOCUMENTS

| | | |
|---|---|---|
| 2,618,586 A | 11/1952 | Hendel |
| 3,336,223 A | 8/1967 | Kneeland |
| 3,803,029 A | 4/1974 | Blecharczyk |
| 4,075,097 A | 2/1978 | Paul |
| 4,075,098 A | 2/1978 | Paul et al. |
| 4,113,606 A | 9/1978 | Mulaskey |
| 4,144,166 A | 3/1979 | DeJovine |
| 4,144,169 A | 3/1979 | Grueschow |
| 4,168,225 A | 9/1979 | Jackson |
| 4,211,639 A | 7/1980 | Jackson |
| 4,265,748 A | 5/1981 | Villani et al. |
| 4,272,371 A | 6/1981 | Moses et al. |
| 4,377,485 A | 3/1983 | Krofta |
| 4,523,532 A | 6/1985 | Moriarty et al. |
| 4,557,829 A | 12/1985 | Fields |
| 4,660,645 A | 4/1987 | Newlove et al. |
| 4,751,901 A | 6/1988 | Moor |
| 4,755,289 A | 7/1988 | Villani |
| 4,886,599 A | 12/1989 | Bachmann et al. |
| 4,888,122 A | 12/1989 | McCready |
| 4,895,640 A | 1/1990 | Jackson |
| 4,902,408 A | 2/1990 | Reichert et al. |
| 4,906,389 A | 3/1990 | Brownawell et al. |
| 5,032,259 A | 7/1991 | He et al. |
| 5,042,617 A | 8/1991 | Brownawell et al. |
| 5,057,368 A | 10/1991 | Largman et al. |
| 5,067,455 A * | 11/1991 | Okajima ................. F01M 9/02 123/196 M |
| 5,069,799 A | 12/1991 | Brownawell et al. |
| 5,069,970 A | 12/1991 | Largman et al. |
| 5,094,747 A | 3/1992 | Johnson |
| 5,199,978 A | 4/1993 | Poirier et al. |
| 5,209,842 A | 5/1993 | Moor |
| 5,225,081 A | 7/1993 | Brownawell |
| 5,472,875 A | 12/1995 | Monticello |
| 5,478,463 A | 12/1995 | Brownawell et al. |
| 5,527,452 A | 6/1996 | Grigoriev et al. |
| 5,552,040 A | 9/1996 | Baehler et al. |
| 5,554,699 A | 9/1996 | Layer et al. |
| 5,591,330 A | 1/1997 | Lefebre |
| 5,704,966 A | 1/1998 | Rohrbach et al. |
| 5,713,971 A | 2/1998 | Rohrbach et al. |
| 5,718,258 A | 2/1998 | Lefebre et al. |
| 5,725,031 A | 3/1998 | Bilski et al. |
| 5,741,433 A | 4/1998 | Mitchell et al. |
| 5,744,236 A | 4/1998 | Rohrbach et al. |
| 5,759,394 A | 6/1998 | Rohrbach et al. |
| 5,772,873 A | 6/1998 | Hudgens et al. |
| 5,891,221 A | 4/1999 | Rohrbach et al. |
| 5,900,153 A | 5/1999 | Sanford |
| 5,902,384 A | 5/1999 | Rohrbach et al. |
| 5,942,323 A | 8/1999 | England |
| 5,948,248 A | 9/1999 | Brown |
| 5,951,744 A | 9/1999 | Rohrbach et al. |
| 6,004,381 A | 12/1999 | Rohrbach et al. |
| 6,045,692 A | 4/2000 | Bilski et al. |
| 6,048,614 A | 4/2000 | Rohrbach et al. |
| 6,117,802 A | 9/2000 | Rohrbach et al. |
| 6,126,823 A | 10/2000 | Soderlund et al. |
| 6,127,036 A | 10/2000 | Xue et al. |
| 6,129,835 A | 10/2000 | Lesieur et al. |
| 6,235,519 B1 | 5/2001 | Wang et al. |
| 6,238,554 B1 | 5/2001 | Martin, Jr. et al. |
| 6,253,601 B1 * | 7/2001 | Wang .................... F01M 11/10 340/438 |
| RE37,369 E | 9/2001 | Hudgens et al. |
| 6,379,564 B1 | 4/2002 | Rohrbach et al. |
| 6,623,636 B2 | 9/2003 | Rohrbach et al. |
| 6,639,034 B2 | 10/2003 | Sivik et al. |
| 6,740,698 B2 | 5/2004 | Akkapeddi |
| 6,743,759 B2 | 6/2004 | Stunkel et al. |
| 6,774,091 B2 | 8/2004 | Dituro et al. |
| 6,843,916 B2 | 1/2005 | Burrington et al. |
| 7,018,531 B2 | 3/2006 | Eilers et al. |
| 7,182,863 B2 | 2/2007 | Eilers et al. |
| 7,291,264 B2 | 11/2007 | Rohrbach et al. |
| 7,811,462 B2 | 10/2010 | Eilers et al. |
| 7,998,346 B2 | 8/2011 | Bilski |
| 8,021,558 B2 | 9/2011 | Eilers et al. |
| 8,047,054 B2 | 11/2011 | Below |
| 2002/0002118 A1 | 1/2002 | Brandt |
| 2002/0136936 A1 | 9/2002 | Grieve et al. |
| 2003/0087769 A1 | 5/2003 | Dituro et al. |
| 2003/0111398 A1 | 6/2003 | Eilers et al. |
| 2003/0119682 A1 | 6/2003 | Saini et al. |
| 2003/0134753 A1 | 7/2003 | Stunkel et al. |
| 2003/0158051 A1 | 8/2003 | Karol |
| 2003/0158501 A1 | 8/2003 | Uchida et al. |
| 2003/0183454 A1 * | 10/2003 | Hall ........................ F01M 1/18 184/6.21 |
| 2004/0058830 A1 | 3/2004 | Kan |
| 2004/0102335 A1 | 5/2004 | Carrick et al. |
| 2005/0019236 A1 | 1/2005 | Martin et al. |
| 2005/0040092 A1 | 2/2005 | Eilers et al. |
| 2005/0167351 A1 | 8/2005 | Herman et al. |
| 2005/0194301 A1 | 9/2005 | Hacker et al. |
| 2006/0254986 A1 * | 11/2006 | Hanson ................ F01M 11/03 210/739 |
| 2008/0190504 A1 | 8/2008 | Bilski et al. |
| 2011/0163047 A1 | 7/2011 | Bilski et al. |
| 2011/0272338 A1 | 11/2011 | Bilski et al. |
| 2012/0031760 A1 | 2/2012 | Cheekala et al. |

FOREIGN PATENT DOCUMENTS

| | | |
|---|---|---|
| DE | 102005003963 | 8/2005 |
| EP | 0078237 | 5/1983 |
| EP | 0416905 | 3/1991 |
| EP | 0416908 | 3/1991 |
| EP | 1061251 | 12/2000 |
| FR | 51254 | 2/1942 |
| FR | 2330856 | 6/1977 |
| GB | 203354 | 9/1923 |
| GB | 904480 | 8/1962 |
| JP | S5845785 | 3/1983 |
| JP | S58178310 | 11/1983 |
| JP | 914011 | 6/1997 |
| JP | H09141011 | 6/1997 |
| JP | 200132754 | 2/2001 |
| JP | 2003532516 | 11/2003 |
| JP | 2003532536 | 11/2003 |
| JP | 2005262203 | 9/2005 |
| JP | 2006516477 | 7/2006 |
| SU | 572072 | 4/1980 |
| SU | 1776423 | 11/1992 |
| WO | WO 9411556 | 5/1994 |

(56) References Cited

FOREIGN PATENT DOCUMENTS

| WO | WO 0162871 | 8/2001 |
| WO | WO 0185300 | 11/2001 |
| WO | WO 02096534 | 12/2002 |
| WO | WO 03055810 | 7/2003 |
| WO | WO 2005123218 | 12/2005 |
| WO | WO 2006137969 | 12/2006 |

OTHER PUBLICATIONS

International Search Report dated Jun. 25, 2008, International Application No. PCT/US2008/053843.
Written Opinion of International Searching Authority dated Jun. 25, 2008, International Application No. PCT/US2008/053843.
Japanese Office Action issued in related application No. 2013-082134 on Jan. 30, 2014.
International Search Report dated Aug. 22, 2011, International Application No. PCT/US2010/062332.
Written Opinion of International Search Authority dated Aug. 22, 2011, International Application No. PCT/US2010/062332.
International Search Report dated Jun. 3, 2004 for PCT/US2004/002144.
Written Opinion of the International Searching Authority dated Jun. 3, 2004 for PCT/US2004002144.

* cited by examiner

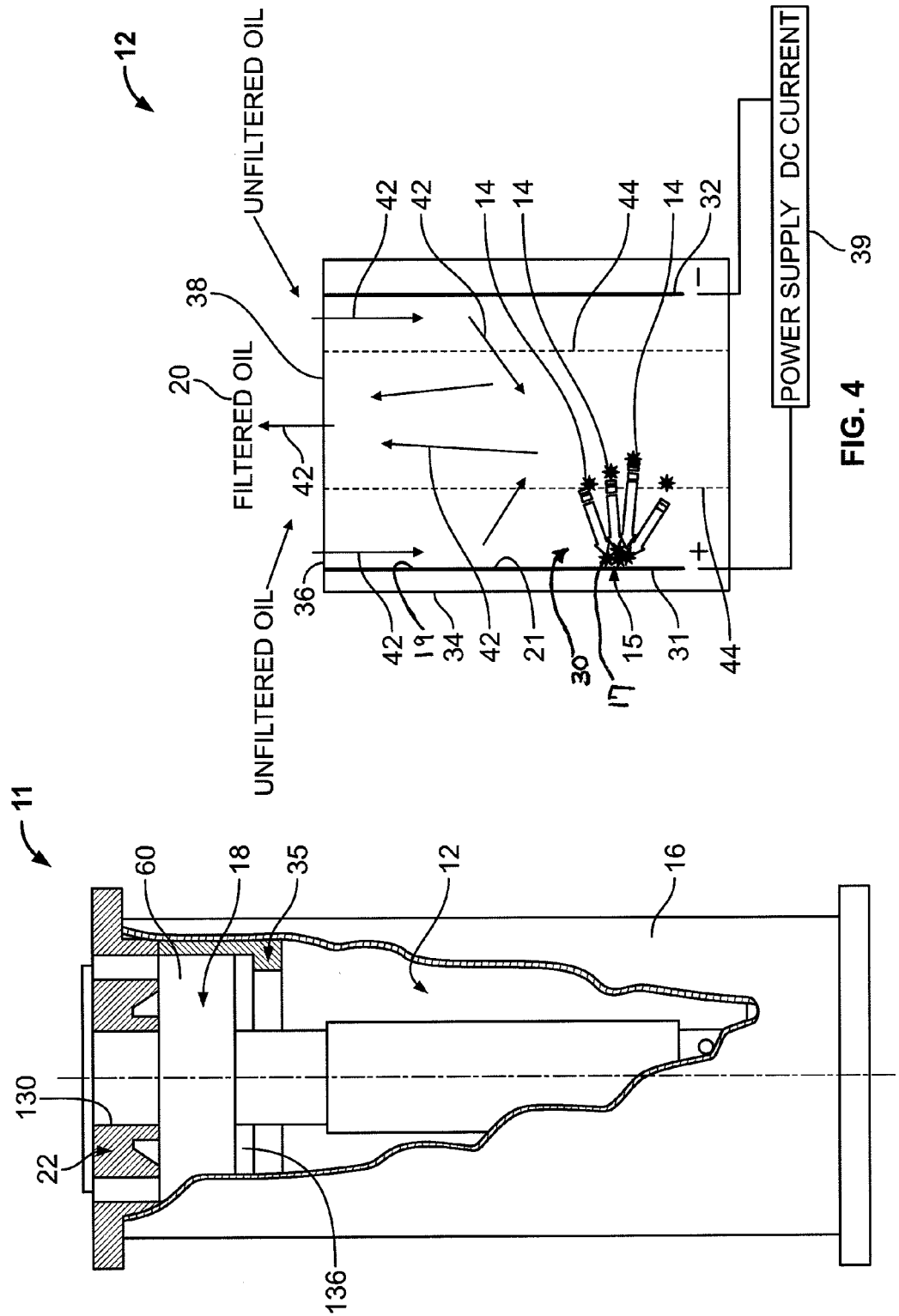

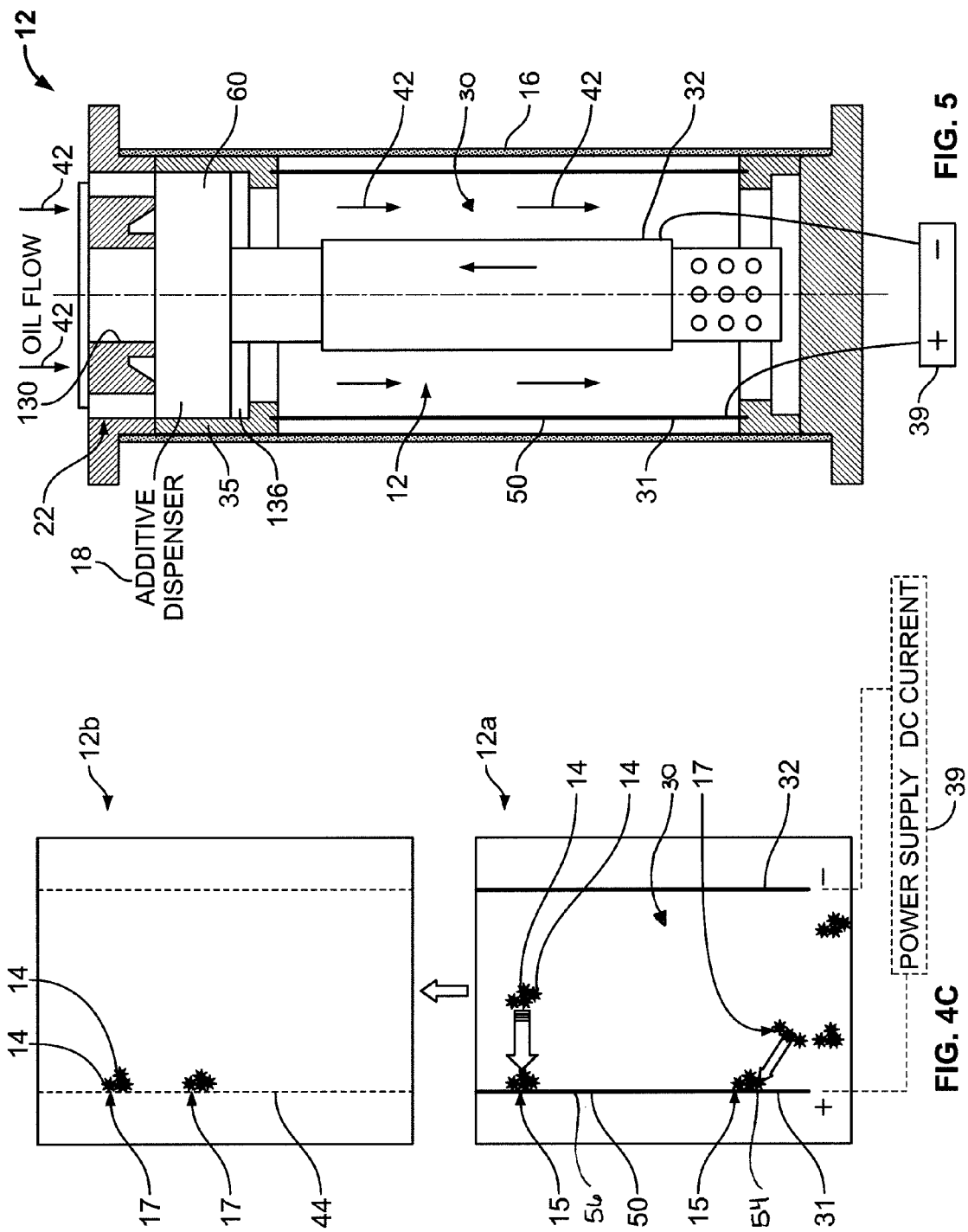

EXTENDED-LIFE OIL MANAGEMENT SYSTEM AND METHOD OF USING SAME

This application claims the benefit of U.S. Provisional Application Ser. No. 61/771,430, filed on Mar. 1, 2013, and entitled "Extended Life Oil Management System and Method of Using Same".

BACKGROUND

1. Field of the Invention

The present invention relates to an oil management apparatus and method for extending the life of oil used as lubrication in automobiles, and more particularly, to removing soot, rust, and other particles from lubricating oils, and monitoring and reducing the amount of such particles exposed to the oil in the oil management system.

2. Description of the Background

In the oil filtration art, it is well known that normal operation of an internal combustion engine results in the formation of contaminants and other particulate material. These contaminants include, among other things, soot, which is formed from incomplete combustion of fossil fuel, corrosive rust, and acids that result from combustion. These contaminants are typically introduced into the lubricating oil during engine operation and exposure to other materials, and they tend to increase oil viscosity and generate unwanted engine deposits, leading to increased engine wear.

A standard type of oil filtration mechanism is a mechanical filter with replaceable cartridges that oil is repeatedly cycled through to remove impurities. Dirty oil passes through these cartridges to be cleaned and is then redistributed throughout the engine for lubrication purposes. Such filtering prevents premature wear on the engine components and increases the usable life of the oil. However, this technique and others become less efficient over time with continual use of the lubricating oil.

SUMMARY

In accordance with one aspect of the present invention, an oil management system is utilized to reduce soot and other contaminants in lubricating oil. The oil management system includes a filter assembly, oxidation prevention means to reduce the formation of such particles, and an oil condition monitoring sensor. For instance, oil may be repeatedly cycled through a filter element that includes multiple particle-removal techniques including a mechanical filter member with porous material, an electroagglomeration apparatus, and application of centrifugal forces to remove impurities. Other techniques include using oil initially formed with a full or partial additive package of various additives or dispersants and a method of replacing spent additives, with the additives configured to resist agglomeration of soot in the oil.

These techniques can be combined with techniques to reduce the formation of soot and other particles, in order to assist with extending the useful life of lubricating oil. For example, as particles such as rust and other contaminates may be formed in metal components while the oil is circulating through the oil management system, the use of oxidation prevention in the oil management system reduces the formation of rust, thereby reducing the amount of rust particles that can contaminate the oil. A sensor may also be used to monitor the condition of the oil as it travels through the oil management system to give a user a precise and accurate reading of the amount of particles in the oil.

Additional features of the invention will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which:

FIG. 3 is a front elevational view of the filter assembly of FIG. 2 with portions broken away to reveal internal components of the filter assembly;

FIG. 4 is a schematic illustration of a cross-sectional view of a filter element of the filter assembly of FIG. 2 taken generally along the lines 4-4 constructed in accordance with an exemplary embodiment;

FIG. 4C is a schematic illustration of a cross-sectional view of a filter assembly similar to that of FIG. 4 and constructed in accordance with yet another alternative exemplary embodiment;

FIG. 5 is a cross-sectional view of the filter assembly taken generally along the lines 4-4 of FIG. 2 connected to a power source and filtering oil from an engine;

DETAILED DESCRIPTION

The present invention is directed to oil management systems generally for use in conjunction with vehicle engines. While the present invention may be embodied in many different forms, specific embodiments are discussed herein with the understanding that the present invention is to be considered only as an exemplification of the principles of the invention, and it is not intended to limit the invention to the embodiments illustrated.

Figure 1:
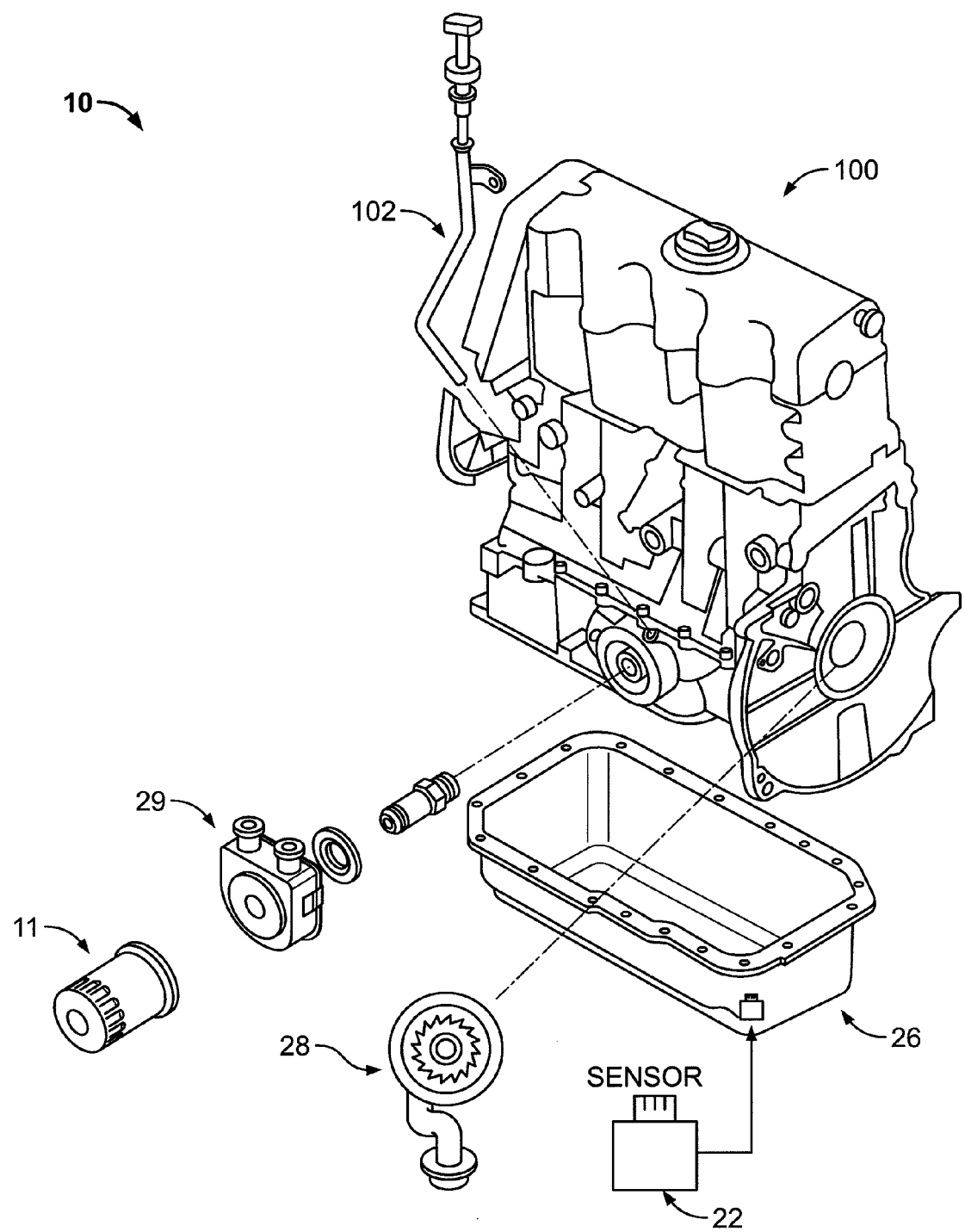
FIG. 1 is a perspective view of an oil management system of the present invention.

As illustrated in FIG. 1, an oil management system 10 includes a replaceable oil filter assembly 11 configured to filter oil 20 circulating through an automobile engine 100, an oil collection sump 26 below the engine 100 for collecting used oil 20 from the engine 100, an oil pump 28 for pumping the used oil 20 back to the oil filter assembly 11, and an oil coolant assembly 29 for cooling the oil 20 before it re-enters the oil filter assembly 11. The oil filter assembly 11 is configured to be removably coupled to the automobile engine 100 to strain oil 20 previously circulated through the engine 100 and remove abrasive particles 14, such as soot. Use of the oil filter assembly 11 along with an oxidation prevention means 140 to prevent creation of particles such as soot and rust as the oil 20 travels through the oil management system 10 increases the efficiency of the oil management system 10 and increases the useful life of the oil filter assembly 11. The inclusion of a sensor 22 in the oil collection sump 26 to monitor the condition of the oil 20 allows a user to gauge when the oil 20 is too particle-laden to continue efficient lubrication of the engine 100, thereby requiring replacement of the oil 20 and/or the oil filter assembly 11.

Oil Filter Assembly

In illustrative embodiments of the oil management system 10, dirty oil 20 enters the oil filter assembly 11 and the particles 14 are removed through various techniques before the oil 20 is redistributed throughout the engine 100. The efficiency of conventional filters is generally reduced as a conventional filter continues to process particle-laden oil 20 from the engine 100, reducing the service life of such filters. Although soot and rust particles 14 are illustrated in this disclosure, it is also understood that exemplary embodiments of the present invention contemplate other particles such as sludge and other insoluble particulates.

Figure 2:
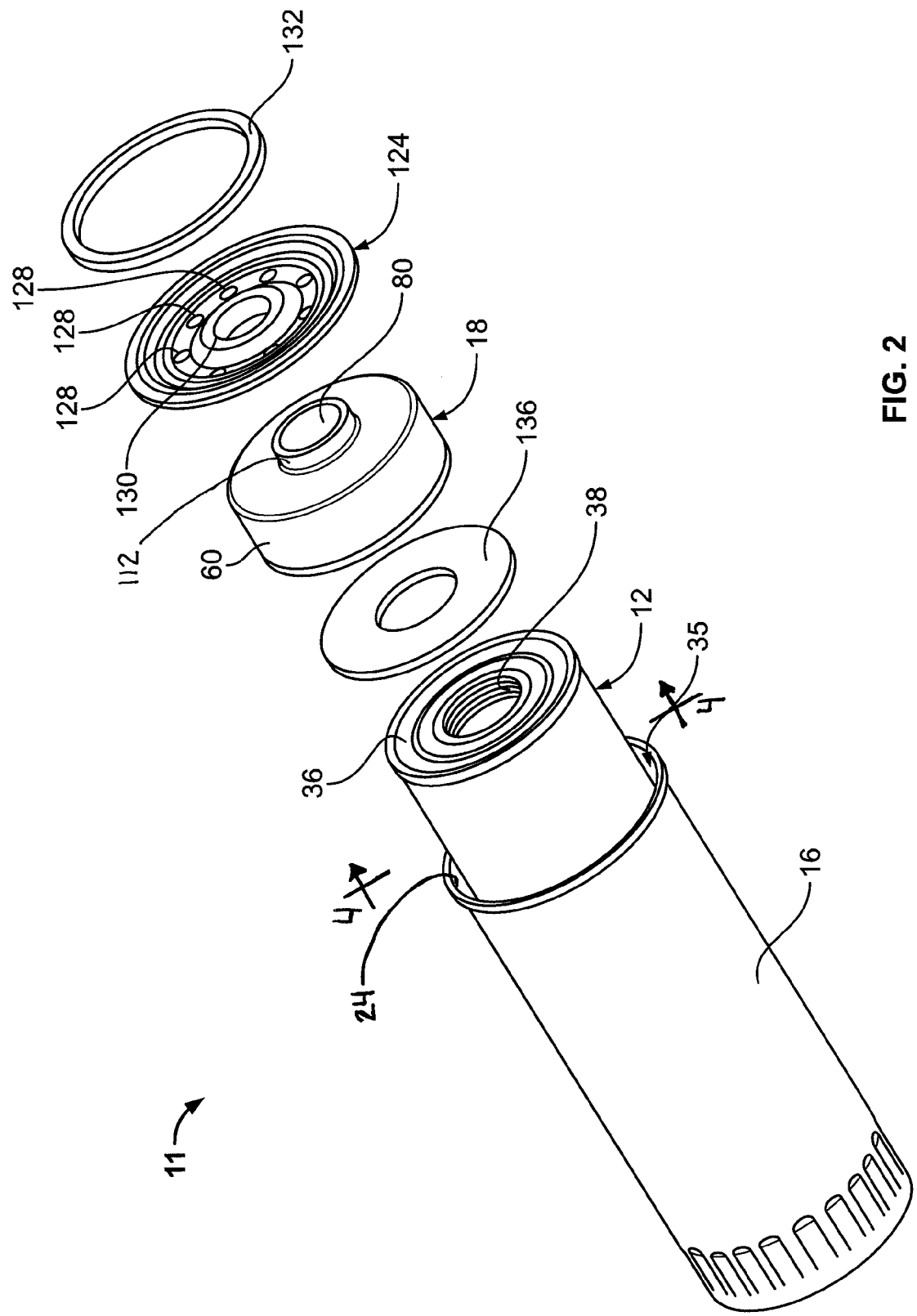
FIG. 2 is an exploded assembly view of a filter assembly of the oil management system of FIG. 1.

An oil filter assembly 11 that utilizes multiple oil filtering techniques may be utilized to extend the life cycle of the oil management system 10. In an exemplary embodiment and as illustrated in FIGS. 2 and 3, an oil filter assembly 11 includes a filter element 12 and an additive cartridge 18, wherein the filter element 12 and the additive cartridge 18 are located in an interior chamber 35 of a cylindrical housing 16 of the oil filter assembly 11. The filter element 12 and the additive cartridge 18 are secured inside the cylindrical housing 16 by a base plate 124 that is configured to fit across an opening 24 of the cylindrical housing 16. An internal gasket 26 may be configured to extend between the filter element 12 and the additive cartridge 18 to connect the filter element 12 to the additive cartridge 18. An external gasket 28 may be utilized to secure the base plate 124 to the housing 16 to maintain a tight fit between the base plate 124 and the housing 16. The present disclosure relates to the use of the various sub-components of the oil filter assembly 11 to extend the useful life of such filter assembly 11 and the oil 20 in the oil management system 10, thereby extending the time period between maintenance and replacement of components of the oil management system 10. Each sub-component of the oil filter assembly 11 will now be described in detail.

Figure 6:
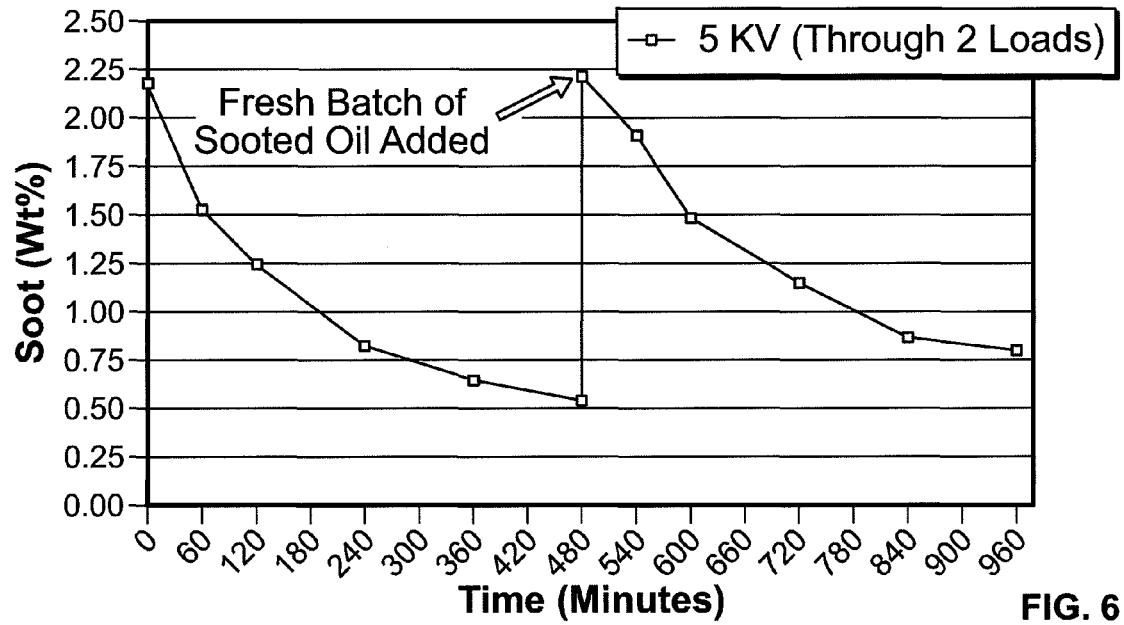
FIG. 6 is a graph illustrating sequential soot removal by electroagglomeration of the filter assembly of FIG. 2.
Figure 7:
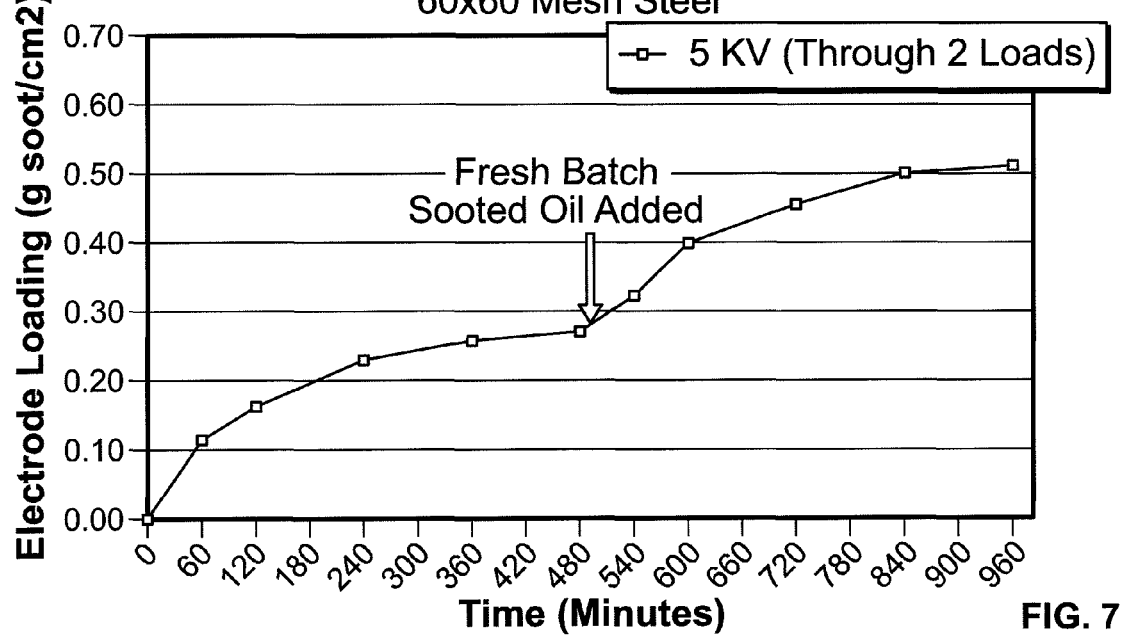
FIG. 7 is a graph illustrating electrode soot loading for sequential soot removal of the filter assembly of FIG. 2.

FIG. 4 illustrates a cross-sectional view of the filter element 12 of the filter assembly 11 as the oil 20 with a plurality of soot particles 14 travels through the filter element 12. In accordance with an exemplary embodiment, the application of a strong electrical field 30 to the oil 20 will cause the particles 14 to agglomerate, thereby enhancing subsequent removal of the particles 14 by centrifugation, filtration media, or other separation techniques. As illustrated in FIG. 5, as the oil 20 is circulated through the interior chamber 35 of the filter assembly 11, the oil 20 will enter the filter element 12 and travel through the electrical field 30 under the process of electroagglomeration. In accordance with an exemplary embodiment, the process of electroagglomeration will cause the average soot particle 14 or other particulate size to increase. This will cause an increase of the sedimentation or collection rate upon application of a centrifugal force or other filtration technique, thereby increasing the efficiency of the filter assembly 11, as illustrated in FIGS. 6 and 7 showing the sequential soot removal and loading of soot particles 14 by electroagglomeration.

The filter element 12 includes a pair of electrodes including a positive (+) electrode 31 and a negative (−) electrode 32. When the electrical field 30 is generated by the pair of electrodes 31 and 32, the soot particles 14 agglomerate into a mass 15 of the soot particles 14 as shown in FIG. 4. As the soot particles 14 agglomerate into the mass 15, the mass 15 is attracted toward the positive electrode 31 and adheres to the positive electrode 31, shown as adhered particle 17. The soot particles 14 may agglomerate directly onto the positive electrode 31 to create adhered particle 17 on the positive electrode 31. In exemplary embodiments, the electrical field 30 causes the soot particles 14 to acquire a charge and migrate to the positive electrode 31 in a one-by one fashion. The positive electrode 31 may include a coating 21 that is applied to the surface, wherein the coating 21 is a soot-collecting agent having properties configured to improve the soot-collecting efficiency on the surface of the positive electrode 31.

In one exemplary embodiment, and upon exposure to the strong electrical field 30, the particles 14 will pre-agglomerate or clump prior to or during a process of migration to the positive electrode 31. This will result in larger average particle size and would likely increase sedimentation and collection rate of the particles 14.

In another exemplary embodiment, the electrodes 31, 32 are removably placed within the filter housing 16 in fluid communication with the oil 20 flowing through the filter assembly 11. Once the positive electrode 31 is loaded with adhered particles 17, the electrodes 31, 32 can be removed and replaced as necessary. As will be discussed herein, the filter element 12 may be a bypass filter element 12 or the electrodes 31, 32 may comprise part of the filter assembly 11 having other separation components (e.g., filtration media and/or a centrifuge). The filter assembly 11 may alternatively comprise the electrodes 31, 32 as part of a series of filter elements 12 in the filter assembly 11, wherein a first filter element 12 comprises the electrodes 31, 32 and any subsequent filter elements 12 contain the other separation components (e.g., filtration media and/or a centrifuge).

Figures 4A, 4B:
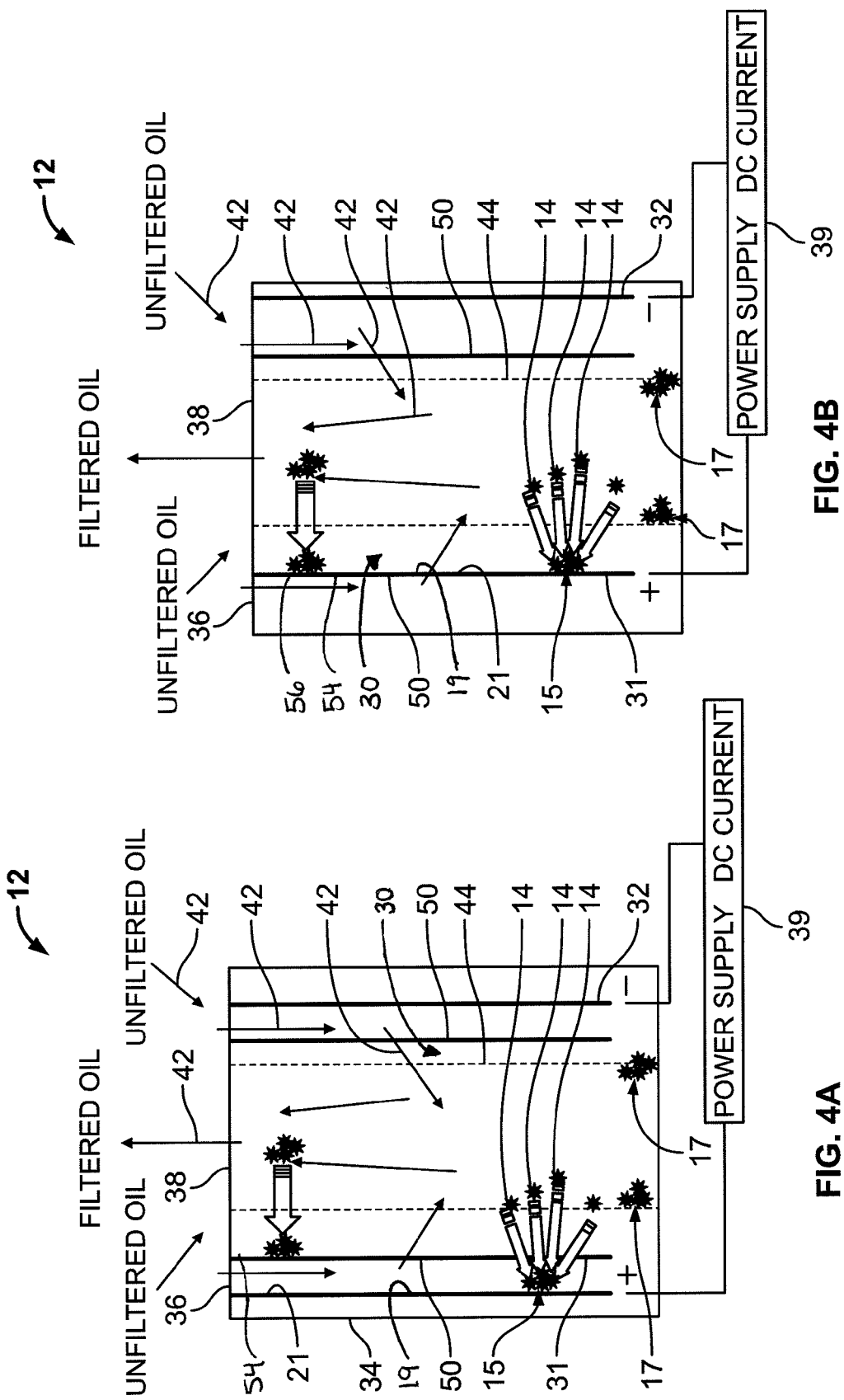
FIG. 4A is a schematic illustration of a cross-sectional view of a filter element similar to that of FIG. 4 and constructed in accordance with an alternative exemplary embodiment.
FIG. 4B is a schematic illustration of a cross-sectional view of a filter element similar to that of FIG. 4 and constructed in accordance with an another alternative exemplary embodiment.

Referring in particular to FIG. 4A, a non-limiting exemplary embodiment of the filter element 12 is schematically illustrated for removing soot particles 14 from engine oil 20 having soot particles 14 disposed therein. The filter element 12 includes a housing 34 having an inlet opening 36 and an outlet opening 38 defining a flow path 42 through a chamber 40 defined by the housing 34. The flow path 42 is illustrated schematically by arrows and it should be understood that the filter element 12 may comprise constructions or configurations alternative to those shown, as the same are merely provided as an illustrative example, namely, that the filter element 12 has at least one inlet opening 36 to receive unfiltered oil 20 and an oil outlet opening 38 to release the oil 20 after it has passed through and/or by the pair of electrodes 31, 32. As shown in FIGS. 4A-4C, the pair of electrodes 31, 32 are electrically connected to a power supply 39. In accordance with an exemplary embodiment and wherein an electrostatic field 30 is generated by the pair of electrodes 31, 32, soot particles 14 agglomerate into a mass or masses 15 of soot particles 14 on the positive electrode 31, as shown in FIG. 4A. To enhance the capability of the positive electrode 31, a coating 21 is applied to a radially-inward-facing surface 19 of the electrode 31, wherein the coating 21 is a soot-collecting agent having properties configured to improve the soot-collecting efficiency thereof.

In accordance with an exemplary embodiment, the coating 21 applied to the surface 19 of the positive electrode 31 may include as components, soot particles 14 extracted from lubricating oil 20, carbon black from acetylene, soot purchased commercially, activated carbon powder, oil-absorbing polymer, other soot-collecting agents or a combination thereof. The coating 21 may be adhered to the surface 19 of the positive electrode 31 using any suitable adhesive material or the like.

In accordance with an exemplary embodiment, the housing 34 of the filter element 12 may be configured to allow removal and replacement of at least the positive electrode 31. For example, the housing 34 may comprise a removable cap (not shown) to access the chamber 40. In one embodiment, the positive electrode 31 is removable for cleaning and replacement or it is removed and discarded while a new positive electrode 31 is inserted into the filter element 12, wherein the new positive electrode 31 is easily coupled to the power supply 39. In one exemplary embodiment, the power supply 39 is integral with the engine 100 or system the filter element 12 is fluidly coupled to. Furthermore, the power supply 39 can be easily connected and disconnected from the filter housing 34 and/or the electrodes 31, 32 to allow removal and replacement of the filter element 12 and/or the positive electrode 31, 32. In one exemplary embodiment, the filter element 12 and housing 34 may be totally removed and replaced or the filter housing 34 may be integral with the engine 100 and comprises the cap for access into the chamber 40 of the housing 34, wherein the electrode(s) 31, 32 may then be removed. As the soot particles 14 agglomerate on the positive electrode 31, the current levels between the electrodes 31, 32 decrease, weakening the electrical field 30 and diminishing the ability of the field 30 to cause the soot particles 14 to agglomerate. Measurement of the current via an ampmeter may help to determine when to remove and replace the positive electrode 31. Thus, the observed current will indicate when the filter element 12 needs to be replaced.

In one alternative exemplary embodiment, and as illustrated by the dashed lines in FIG. 4A, a mechanical filter member 44 is also disposed inside the housing 34 of the filter element 12, wherein the mechanical filter member 44 is positioned in the flow path 42 of the oil 20 and the mechanical filter member 44 is configured to filter the oil 20 prior to its flowing out of the filter element 12. The mechanical filter member 44 may enhance the filtering process by filtering the larger diameter or size soot particles 14 through a filtration media of the mechanical filter member 44, wherein the soot particles 14 are disposed upon a surface of the filtration media. The filtration media may be any media capable of providing the desired results (e.g. cellulose, nylon, synthetic or equivalents thereof).

In another alternative embodiment, and as will be discussed herein, the mechanical filter member 44 may be disposed in the same housing 34 of the filter element 12 with the pair of electrodes 31, 32. Alternatively, the mechanical filter member 44 may be in a second, separate housing 34b (not shown) in the filter element 12 in fluid communication with the housing 34 containing the pair of electrodes 31, 32. As another alternative, the mechanical filter member 44 may be located in a second filter element 12b that is in communication with a first filter element 12a containing the pair of electrodes 31, 32. In any scenario, the pair of electrodes 31, 32 may be disposed in the oil flow path 42 after the inlet opening 36 but downstream of the mechanical filter member 44. This placement will ensure that the larger sized agglomerated particles 14 will be captured by the filter media of the mechanical filter member 44, or, in the alternative, a rotatable centrifuge member 50, as discussed hereafter.

Alternatively, only the positive electrode 31 may be disposed before an exterior filter media of the mechanical filter member 44. It is, of course, understood that the electrodes 31, 32 may comprise any arrangement as long as the desired affects of the electrical field 30 are achieved. In accordance with an exemplary embodiment and in order to remove the agglomerated soot particles 14, at least the positive electrode 31 is removable from the filter element 12, wherein the positive electrode 31 is either removed and replaced or cleaned and replaced. It is also understood that the other electrode 32 may also be removable. Alternatively, the electrodes 31, 32 may be fixed in a removable filter element 12 comprising the housing 34 that is removably secured to an oil circuit; thus, they are not removable from the housing 34 of the filter element 12 and simply accumulate soot particles 14 on the positive electrode 31 until the filter element 12 or housing 34 comprising the electrodes 31, 32 needs to be replaced.

For example, and in one embodiment, the filter element 12 comprising the housing 34 is a screw-on type of filter element 12 wherein the entire housing 34 comprising the electrodes 31, 32 is removable and replaceable. Alternatively, and when the housing 34 is integral with the engine 100, the housing 34 may have a cover portion that is removable and the electrodes 31, 32 may be simply removed. If applicable, the filter media of the mechanical filter member 44 may also removed.

Referring in particular to FIG. 4B, another non-limiting exemplary embodiment is illustrated schematically. In accordance with this exemplary embodiment, the electric field 30 also causes the soot, sludge and other insoluble particles 14 from the oil 20 to agglomerate, resulting in a larger average particle diameter or size. These particles 14 are removed by a filtering process, which may or may not include the removable positive electrode 31. In other words, the electrodes 31, 32 are used to increase the particle size of the mass 15 of the particles 14 prior to its filtration through other filtration techniques. Thus, in this embodiment, the mass 15 of the particles 14 is removed using other filtration techniques (e.g., centrifugal force or mechanical filtering).

In one alternative exemplary embodiment, and as illustrated by the dashed lines in FIG. 4B, the mechanical filter member 44 is disposed inside the housing 34 of filter element 12 in the oil flow path 42 and is configured to filter the engine oil 20 prior to its exiting the filter element 12.

In another alternative embodiment, also shown in FIG. 4B, the filter element 12 further comprises a rotatable centrifuge member 50 capable of applying a centrifugal force 52 to the oil 20. The centrifugal force 52 causes the soot particles 14 to be disposed upon an outer periphery surface 54 of the centrifuge member 50, the surface 54 being any suitable surface such a mesh screen or other filtration media. The surface 54 is also removable from the filter element 12 to allow for removal of the agglomerated particles 14. This filter element 12 may comprise the pair of electrodes 31, 32, the filter media, the centrifuge member 50, or any combination thereof. In this embodiment, a motor 110 or oil flow path 42 or both is used to apply a rotational, centrifugal force 52 to centrifuge member 50 to cause the centrifugal force 52 to be applied to the oil 20.

In one alternative exemplary embodiment, the electrodes 31, 32 may include a surface 56 of metallic mesh serving as the positive electrode 31 and may be formatted in a spiral wound, pleated, concentric or stacked plate arrangement, as illustrated in FIG. 4B. The positive electrode 31 may also be in the form of a conducting fiber packed into a fixed-bed flow arrangement. Alternatively, the positive electrode 31 may be formed of stainless steel, copper, aluminum, platinum or other electrically conducting material. In one exemplary embodiment, the surface 56 of the positive electrode 31 has a coating 21 applied, wherein the coating 21 is a soot-collecting agent such as soot particles 14 extracted from lubricating oil, carbon black from acetylene, soot purchased commercially, activated carbon powder, oil-absorbing polymer, other soot-collecting agents or a combination thereof configured to improve the soot-collecting efficiency on the surface 56 of the positive electrode 31. In another alternative embodiment, the centrifuge surface 54 of a centrifuge member 50 may also serve as the positive electrode 31, thus combining electrostatic with centrifugal separation in a single electro-mechanical device. Alternatively, the centrifuge member 50 and the positive electrode 31 may be separate items.

In accordance with an exemplary embodiment, the filter assembly 11 may include multiple filter elements 12 that may be connected in series or alone as stand alone filter elements 12, wherein each of the filter elements 12 is in fluid communication with each other via an oil circulation system. For example, the system may comprise only one filter, as illustrated in FIGS. 4A and 4B, or any combinations of the filters illustrated, as illustrated in FIG. 4C. FIG. 4C illustrates that the filter assembly 11 may include a first filter element 12a having a centrifuge member 50 with a pair of electrodes 31, 32 to separate the pre-agglomerated oil 20 and thereafter, a second filter element 12b having a mechanical filter member 44 with filter media disposed in a filter housing 34 to further separate additional soot particles 14 from the oil 20 that were not separated in first filter element 12a.

Thus and in summary, the filter element 12 of the filter assembly 11 may comprise only the pair of electrodes 31, 32 with at least one of the electrodes 31, 32 being removable. Alternatively, the filter element 12 may comprise the pair of electrodes 31, 32 and a filtration media such as the mechanical filter member 44 configured to filter the larger diameter preagglomerated soot particles 14. In yet another alternative embodiment, the filter element 12 will comprise the pair of electrodes 31, 32 and a centrifuge member 50 for applying a centrifugal force 52 to the preagglomerated soot particles 14 and a removable surface 54 for collecting the preagglomerated soot particles 14. In yet another alternative exemplary embodiment, the centrifuge member 50 and the positive electrode 31 are combined or are one in the same. In still yet another alternative embodiment, the filter element 12 may comprise the pair of electrodes 31, 32, a filtration media such as the mechanical filter member 44 configured to filter the larger diameter preagglomerated soot particles 14, and a centrifuge member 50 for applying a centrifugal force 52 to the preagglomerated soot particles 14 having a removable surface 54 for collecting the preagglomerated soot particles 14.

Figure 8:
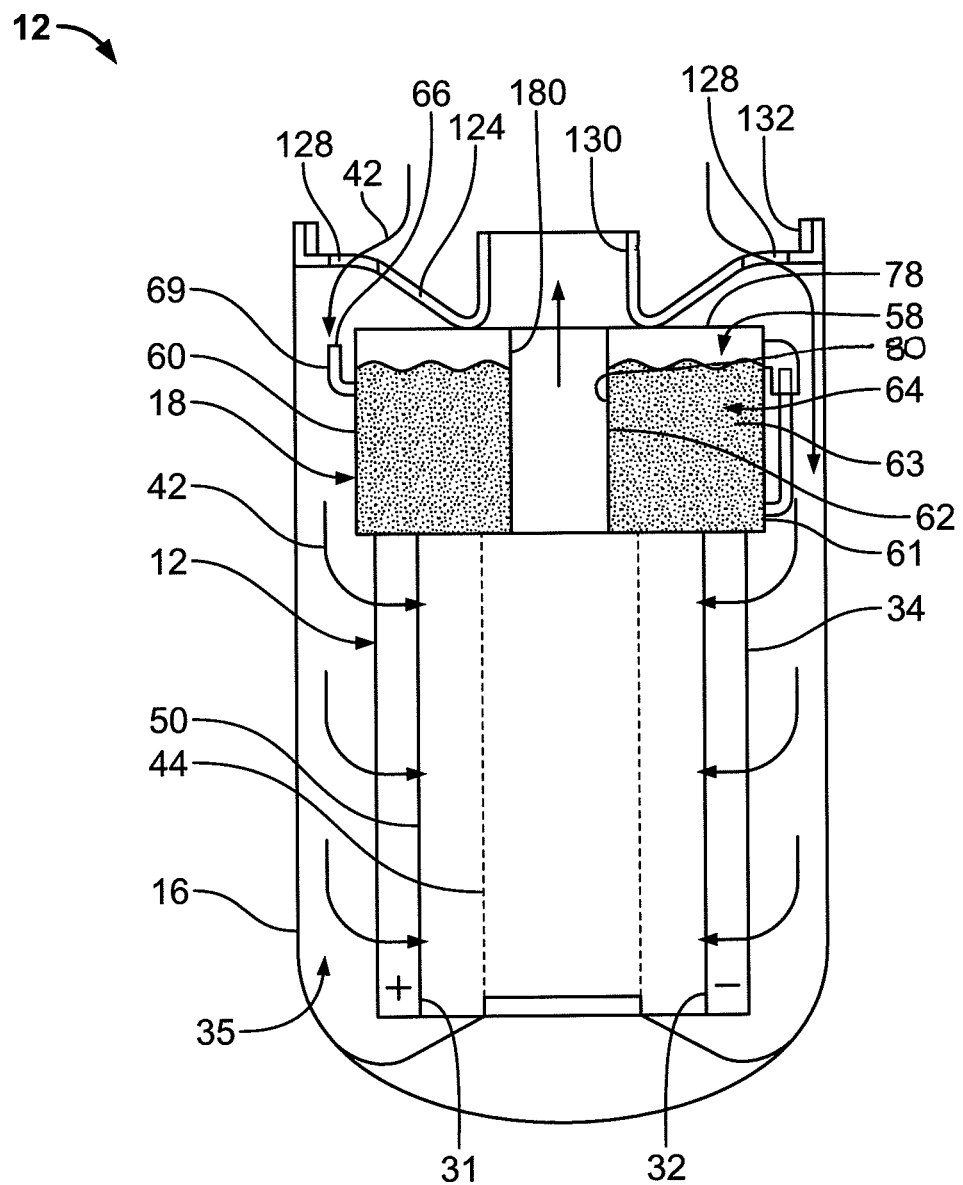
FIG. 8 is a schematic cross-sectional view of the oil filter of FIG. 2 with an additive cartridge.

The additive cartridge 18 of the filter assembly 11 will now be addressed. As illustrated in FIG. 8, the additive cartridge 18 may be positioned adjacent to the filter element 12 inside the housing 16 such that oil 20 will interact with the additive cartridge 18 prior to or after being filtered through filter element 12. The additive cartridge 18 provides a means for introducing an additive 63 into oil 20 passing through filter assembly 11. The additive cartridge 18 is configured to provide a means for retaining the additive 63 for dispersement into the oil 20 over an extended period of time. In particular, the additive cartridge 18 provides a means for continuously dispersing a small quantity of additive 63 in an accurate manner.

In illustrative embodiments, a fully or partially formed additive 63 package may be added to oil 20 during its initial formation. Additives 63 are configured to resist agglomeration of soot in the oil 20 and may also inhibit corrosion. Such additives 63 may include antioxidants, friction modifiers, pour point depressants, detergents, viscosity index improvers, anti-wear agents, and/or extreme pressure additives. The amount and concentration of the additives 63 may be limited by the ability of the lubricating oil 20 to suspend the additive and the chemical stability of the additives 63. Thus, the additive cartridge 18 is configured to slowly release new additive 63 over the useful life of the filter element 12, thereby replacing any additives 63 from the initial formation that were filtered out while the oil 20 traveled through the oil management system 10.

Referring to FIGS. 2 and 8, the oil filter assembly 11 generally includes a hollow cylindrical housing 16 which defines a hollow interior chamber 35, a filter element 12 within the chamber 35, and a centrally located additive cartridge 18 that is also retained inside the interior chamber 35. The housing 16 also includes a base plate 124 sealingly attached to the housing 16. The base plate 124 includes a plurality of inlet ports 128 formed therethrough and arranged in a circular pattern, as illustrated in FIG. 2. The base plate 124 also includes a central outlet port 130. The outlet port 130 has a plurality of female threads 112 formed therein, to allow rotatable mounting of the filter on an externally threaded fitting on an engine 100, as illustrated schematically in FIG. 1. An annular external gasket 132 secures engagingly to the base plate 124 to resist oil leakage outwardly from the filter assembly 11. An internal gasket 136 is disposed between additive cartridge 18 and the filter element 12 to allow a secure flow path 42 for fluid flowing therebetween.

The additive cartridge 18 includes a housing 60 having an exterior wall 61 and an interior wall 62 that are concentric and define a chamber 64 therebetween. A liquid additive 63 is deposited in chamber 64 for release into the filter assembly 11. After a liquid additive 63 is added to chamber 64, a cap 82 configured to be secured to housing 60 is secured to the housing 60 after the additive 63 is disposed therein. In one embodiment, once the cap 82 is secured to the housing 60, the housing 60 is oriented in the filter assembly 11 so that the cap 82 is positioned away from the filter element 12. The cartridge housing 60 and the cap 82 of the additive cartridge 18 are configured to provide an outlet path 72, which is in fluid communication with the filter element 12 so that filtered oil 20 or fluid may pass therethrough. In the illustrated exemplary embodiment, the chamber 64 is concentric about the outlet path 72.

Figure 11:
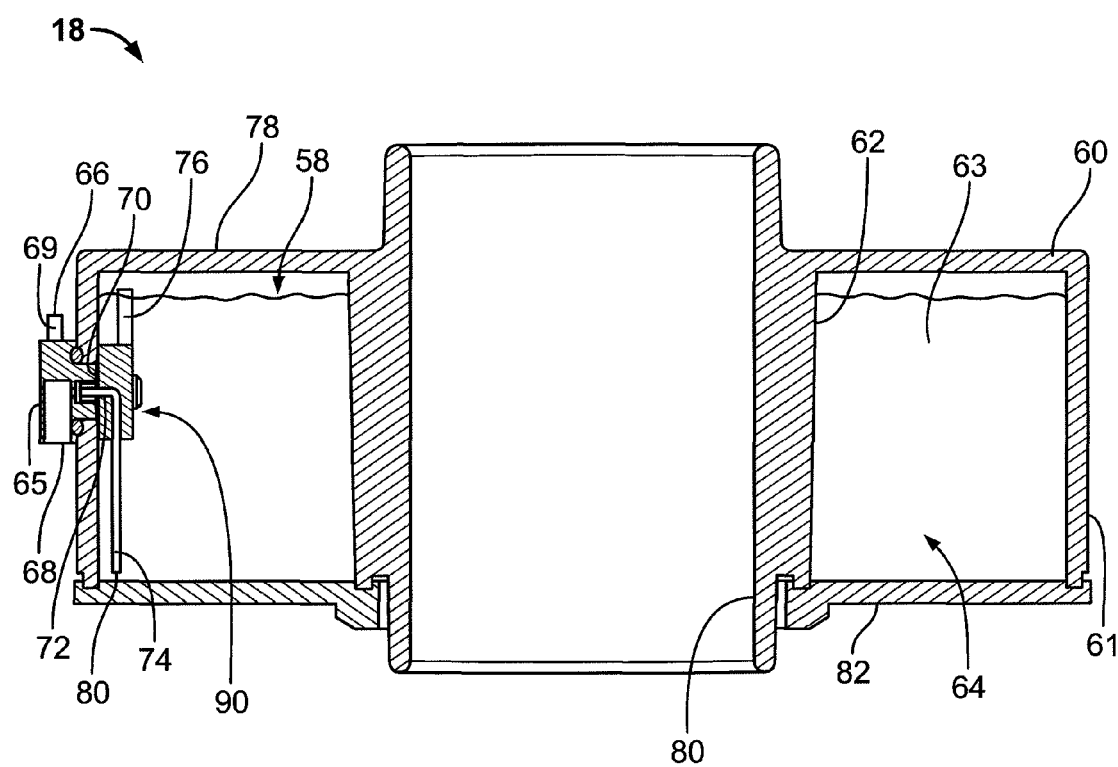
FIG. 11 is a cross-sectional view of the entire additive cartridge of FIG. 8.
Figure 12:
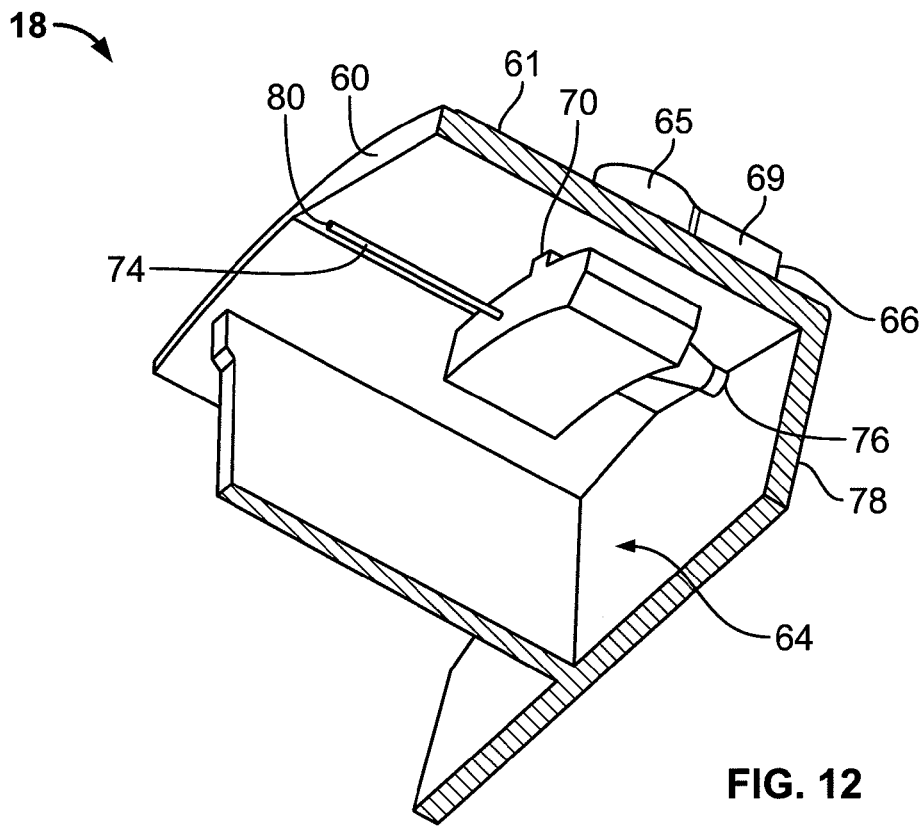
FIG. 12 is a partial sectional perspective view of a portion of the additive cartridge of FIG. 8.
Figure 13:
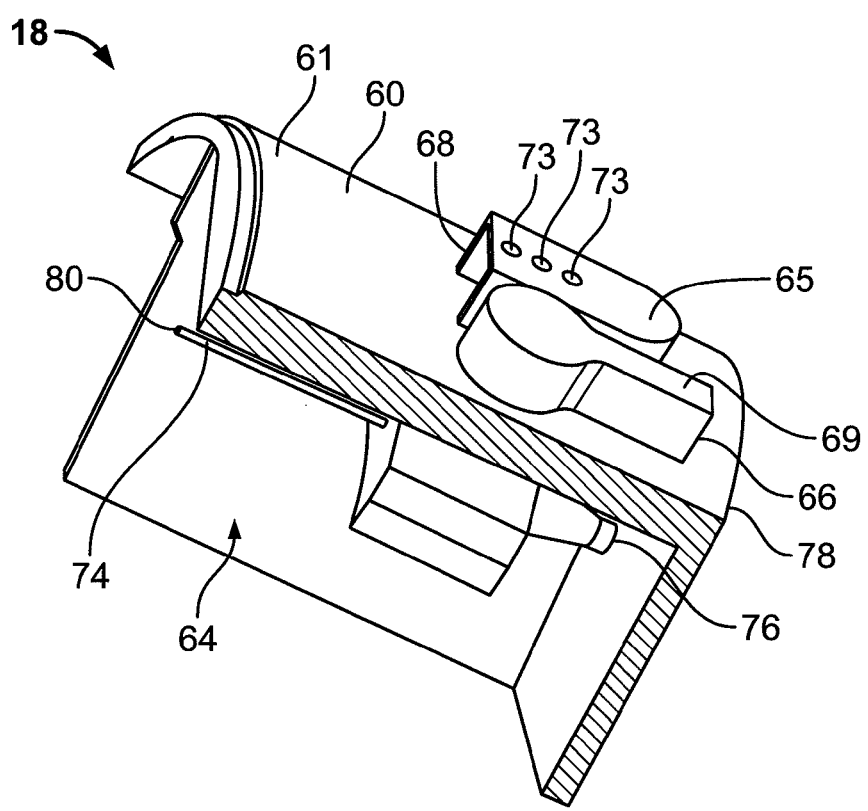
FIG. 13 is a partial sectional perspective view of the portion of the additive cartridge in FIG. 8 and taken at a different angle than the view of FIG. 12.

An entrance port or inlet opening 66 provides an opening that extends through an entrance channel or inlet path 70 through an exterior wall 61, as illustrated in FIGS. 9-13. Similarly, an exit port or outlet opening 68 provides an opening that extends through an exit channel or outlet path 72 in exterior wall 61. A shroud or canopy 65 is positioned over the exit port 68 to create an iso-static pressure region so no additional pressure areas are created, as illustrated, for example, in FIG. 11. In addition, the canopy 65 is also configured to have an opening or openings 73 as illustrated in FIG. 13, which prevent negative pressures in the housing 16 of the filter assembly 11 from sucking or pulling the additive 63 from the additive chamber 64, which would result in undesirable dispersement of the additive 63 or uncontrollable flow rate. Both the entrance port 66 and the exit port 68 provide a pathway for fluid and/or liquid such as the oil 20 in the interior chamber 35 of filter assembly 11 to enter the chamber 64 of the additive cartridge 18. Preferably, the entrance port 66 is located below a top edge 78 of the housing 60 on the exterior wall 61 to minimize turbulence from the fluids flowing through the filter assembly 11.

In accordance with exemplary embodiments, the additive cartridge 18 can be provided with the entrance and exit ports 66, 68 as an integrated one-piece dispensing structure 90, or alternatively, as a two-piece (or more) dispensing structure(s) 90, in which the pieces are interconnected. Such a connection can be, for example, a threaded connection sealed with adhesive, snap-fit, ultra-sonic welded, or spin-welded, as desired.

In an exemplary embodiment and as illustrated in FIG. 8, the entrance port 66 is provided as an inlet tube 69 that faces toward inlet ports 128 of the filter assembly 11 to receive oil 20 in the path of the fluid flow 42. In this embodiment, the inlet tube 69 provides a fluid conduit for liquid in the interior chamber 35 to flow through the exterior wall 61 to a discharge port 76 that opens into the chamber 64. In the present exemplary embodiment, the discharge port 76 is disposed above the additive 63 level in an air pocket 58 above the additive 63 so that drainage during off times does not occur. Here, the pressure differential between the inner chamber 64 of the additive cartridge 18 and the inner chamber 35 of the filter assembly 11 can equalize through reverse fluid flow back through the entrance channel 70 without dispersing more additive 63 during shut down of the engine 100.

In other exemplary embodiments, the discharge port 76 can be disposed beneath or at the additive 63 level if a shut off valve is utilized. In this embodiment, the shut off valve would cover the discharge port 76 and provide a means for allowing oil 20 to travel into the housing 60 in one direction only. Preferably, the length and/or diameter of the inlet tube 69 can be selected to take advantage of the fluid pressure generated by the liquid flowing through the filter assembly 11 and to create a controlled release of the additive 63 based on the stagnation pressure driving flow through an exit channel 72 of the additive cartridge 18

Figure 9:
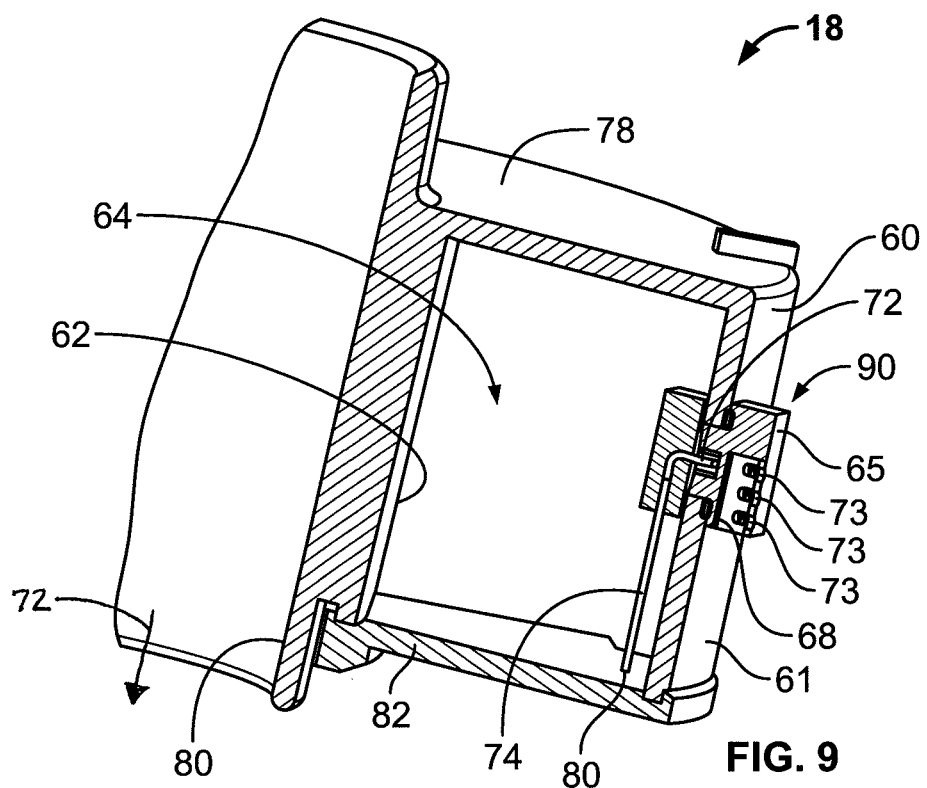
FIG. 9 is a cross-sectional view of a portion of the additive cartridge of FIG. 8 taken generally along the lines 4-4 of FIG. 2 and depicting a dispensing structure within the additive cartridge.
Figure 10:
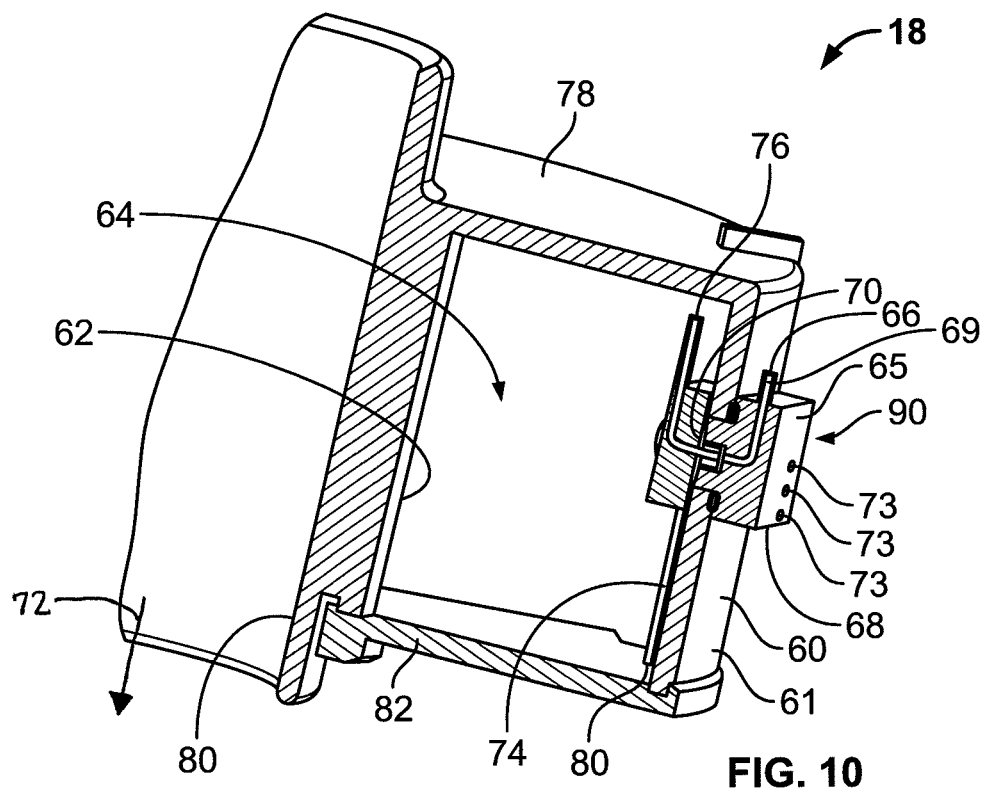
FIG. 10 is an alternative cross-sectional view similar to FIG. 9 and depicting a further dispensing structure for use within the additive cartridge of FIG. 8.

In exemplary embodiments, an inlet fluid path (e.g., the fluid path between entrance port 66 and the discharge port 76) can comprise a "U" shaped or "L" or other shaped geometry to connect the entrance port 66 to the discharge port 76 through the entrance channel 70 and other necessary fluid path conduits, illustrated in FIGS. 9 and 10. In this manner, the inlet tube 69 will provide the entrance channel 70 with an outer leg portion that opens to the inlet ports 128 of the filter assembly 11 through the entrance port 66 between the additive cartridge housing 60 and the housing 16 of the filter assembly 11, and an inner leg portion that opens to the chamber 64 through discharge port 76 into the air pocket 58 above the additive 63 level in the additive chamber 64, as illustrated in FIGS. 11 to 13.

Therefore, in exemplary embodiments of the present invention in which an inlet fluid path is used to create a stagnation pressure in the additive cartridge 18, the amount of additives 63 will be less likely to be immediately filtered out of the engine oil 20 upon initial release and can provide for a longer-lasting slow-release of the additives 63, thereby extending the useful life of engine oil 20 so as to allow a user to extend the time interval between oil changes of an engine 100.

In accordance with an exemplary embodiment and as illustrated in FIG. 11, an outlet tube 74 extends from an opening 84 located beneath the additive 63 level within the chamber 64 through the exit channel 72 in the exterior wall 61. In this exemplary embodiment, the outlet tube 74 extends adjacent to the exterior wall 61 to the opening 84 that is proximate to the bottom of the chamber 64. In other exemplary embodiments, the outlet tube 74 could be disposed elsewhere. In one non-limiting exemplary embodiment, a shut off valve is used with outlet tube 74 that can be closed during no flow conditions.

By connecting the discharge of the inner leg portion of a U-tube shaped or "L" or other shaped inlet tube 69 in the pressure in the air pocket 58 above the additive 63 level in the additive chamber 64, the initial release of additive 63 into the flow of oil 20 can be more effectively controlled. Static pressure and flow test results in exemplary embodiments have indicated that the use stagnation pressure created by the fluid flow of the oil 20 flowing through the filter assembly 11 to create pressure in the chamber 64 can reduce the initial release of additive 63 by 50% or more. For instance, in one exemplary embodiment, and by controlling the opening 80 of the outlet tube 74 was found to reduce the initial additive 63 release from a range of about 20-30% of the total additive 63 to less than 10% of the total additive 63.

The inlet tube 69 is disposed in a location that exhibits the intended rate of fluid flow to achieve the desired stagnation pressure. In an exemplary embodiment, the inlet tube 69 can be disposed equidistant between the housing 16 of filter assembly 11 and the cartridge housing 60, as illustrated in FIG. 8, so as to receive fluid flow having a laminar velocity. The inlet tube 69 and the entrance port 66 can be provided in a variety of configurations including a round, oval, flattened configuration, or configured to conform to the space between the exterior of the filter element 12 and the interior of the housing 16.

As described above and as illustrated in FIGS. 9-13, an opposite end of inlet tube 69 from the entrance port 66 extends to a the discharge port 76 that opens into the chamber 64. In the illustrated embodiment, the inlet tube 69 extends from the entrance port 66 a desired length adjacent to the exterior wall 61. The oil 20 flowing into the chamber 64 is used to create a controlled release of the additive 63 based on the stagnation pressure driving fluid flow through the outlet tube 74. In one exemplary embodiment it is preferable that the incoming oil 20 mix sufficiently with the additive 63 contained within the chamber 64. Adequate mixing of the oil 20 and the additive 63 can be promoted by increasing the period of time that the oil 20 remains in chamber 64, as well as by increasing the distance that the incoming oil 20 must flow in the chamber 64 before exiting out the exit port 68.

The exit port 68 is spaced lower than openings 73 on the exterior wall 61 and, in the illustrated embodiment, centrally positioned in the exterior wall 61 to extend centrally into the chamber 64, as illustrated in FIGS. 11 to 13. It will be understood, however, that the exit port 68 can be positioned as desired in the exterior wall 61 to extend into and/or through any portion of the chamber 64. As illustrated in the present exemplary embodiment, the exit port 68 leads into the outlet tube 74 extending into the chamber 64. The outlet tube 74 provides a conduit between the chamber 64 and the exit port 68. As discussed above, the canopy 65 covers the exit port 68 that is in fluid communication with the opening 80 of the outlet tube 74 to create an isostatic pressure region to ensure that no additional pressure areas are created.

In use, the liquid oil 20 to be filtered flows into the housing 16 of the filter assembly 11 through the inlet ports 128. From there and in the illustrated exemplary embodiment, the liquid oil 20 flows down between the housing 16 of the filter assembly 11 and the housing 60 of the additive cartridge 18. Oil 20 flows into the inlet tube 69 through the entrance port 66. The oil 20 flowing through the filter assembly 11 (or any filter assembly) will exhibit a known fluid velocity. The stagnation pressure can thus be calculated from the velocity and density of the flowing oil 20. Exemplary embodiments can take advantage of the stagnation pressure by creating a differential pressure between the entrance port 66 and the exit port 68. Since the entrance port 66, like the inlet tube 69, is aligned perpendicularly with the direction of flow of oil 20, a stagnation zone forms in front of the entrance port 66 that causes the dynamic pressure to be converted to a static pressure that is harnessed to drive the oil 20 flow slowly into the inlet tube 69 and through the additive cartridge 18. The flow can then be calculated based upon the pressure drop, the inlet tube 69 diameter and length, and the viscosity using Darcy's Law, and the inlet tube 69 diameter and length can be adjusted to achieve the desired flow, thereby tailoring the release rate of the liquid additive 63.

Prevention of Particle Creation

Another component of the oil management system 10 is the oxidation prevention means 140. As illustrated in FIGS. 14 to 17 and in illustrative embodiments, the oil collection sump 26 and other components of the oil management system 10 may include the oxidation prevention means 140 that prevents oxidation that can impact the components of the oil management system 10, thereby reducing the amount of particles 14 that the oil 20 may be exposed to.

As the oil collection sump 26 and other components of the oil management system 10 are formed from steel and other metals, oxygen in the oil management system 10 supports the formation of corrosion, rust and the growth of microorganisms in the oil management system 10. In the presence of steel, the corrosion rate of oxygen increases exponentially as the heat rises. Oxygen corrosion weakens the metal and sends dissolved iron particles into the surrounding environment, such as the oil 20 in the oil management system 10.

Figure 14:
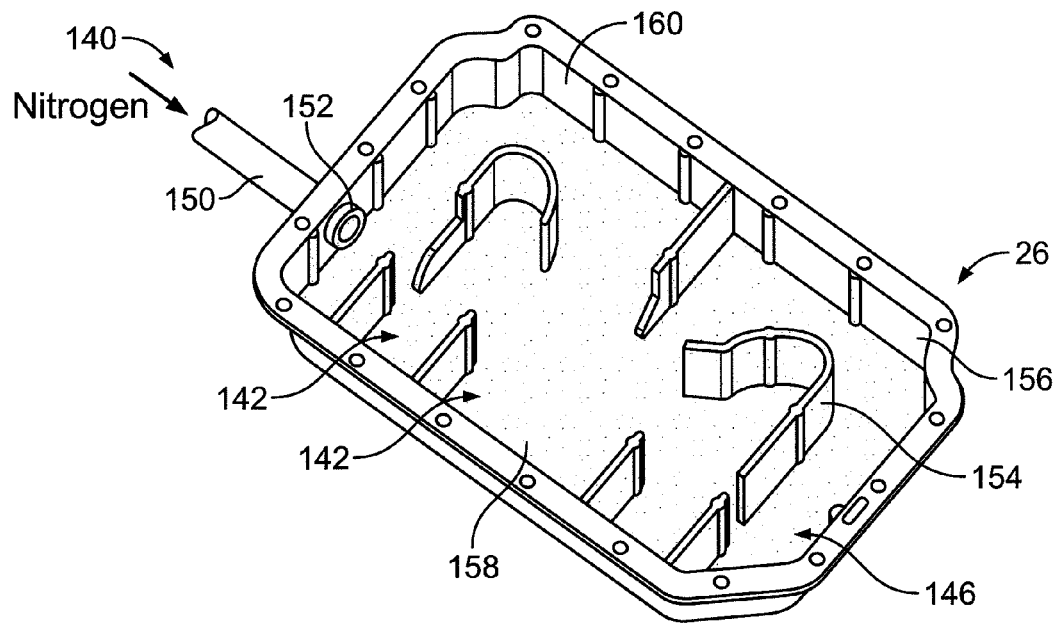
FIG. 14 is a front perspective view of an oxygen-scavenging means located in an oil collection sump of the oil management system of FIG. 1.
Figure 15:
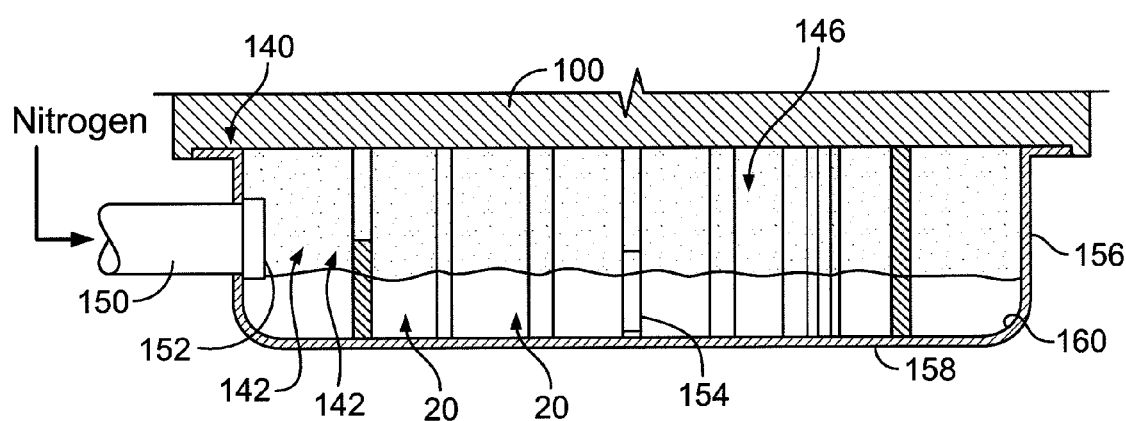
FIG. 15 is a cross-sectional view of the oxygen-scavenging means and the oil collection sump taken generally along the lines 15-15 of FIG. 14.
Figure 16:
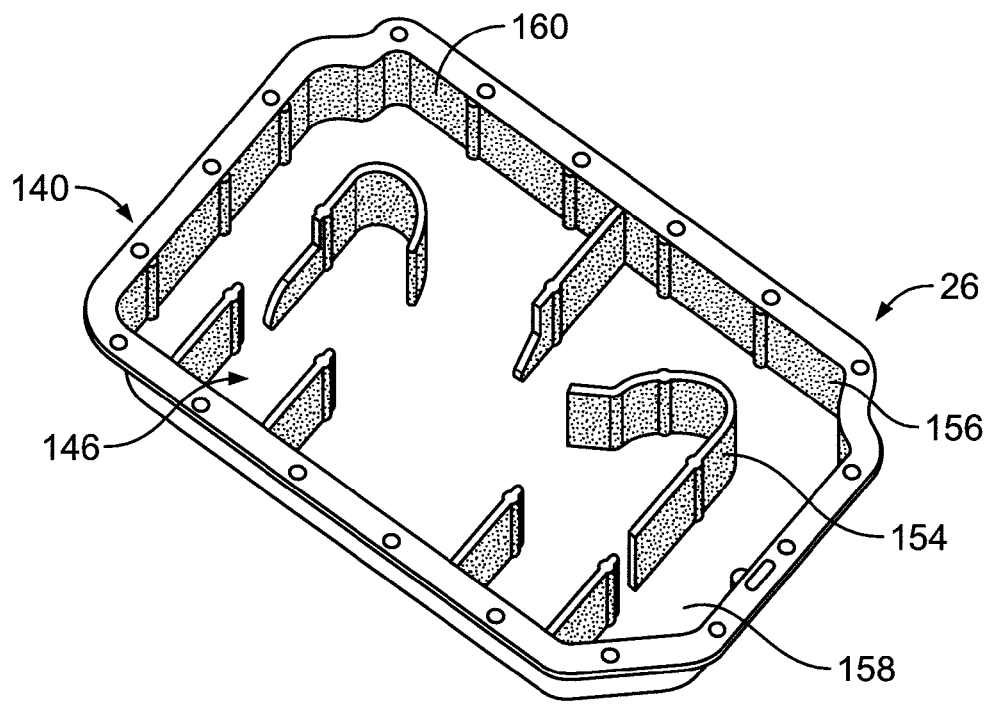
FIG. 16 is a front perspective view of an alternative oxygen-scavenging means located in the oil collection sump of the oil management system of FIG. 1.
Figure 17:
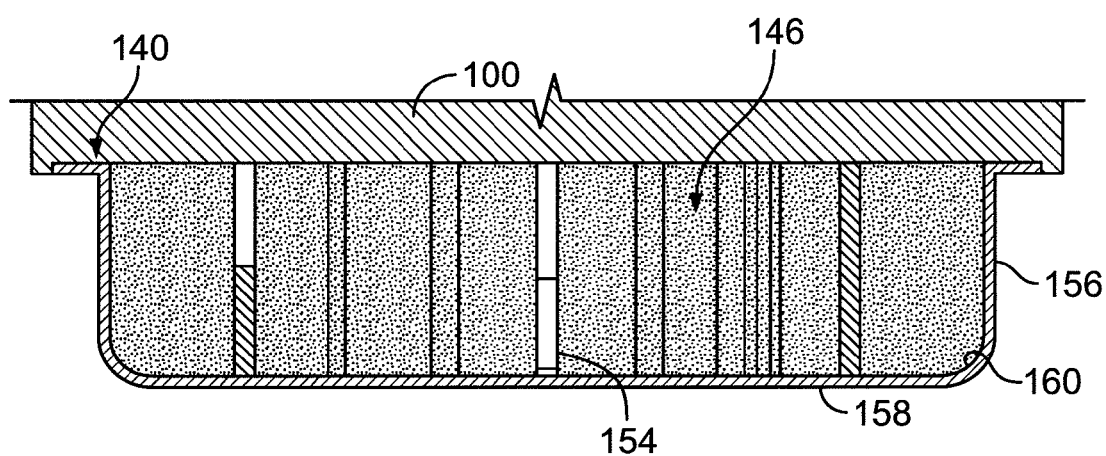
FIG. 17 is a cross-sectional view of the oxygen-scavenging means and the oil collection sump taken general along the lines 17-17 of FIG. 16.

The oil collection sump 26 may include several components that are made of steel or iron. As illustrated in FIGS. 14 to 17, the collection sump 26 may include steel components such as an annular side wall 156, a base 158, and ballets 154 extending from the base 158 that assist the flow of oil 20 in the oil collection sump 26. The oil collection sump 26 includes an air space 146 above the oil 20, as illustrated in FIGS. 15 and 17, and oxygen located in the air space 146 of the oil collection sump 26 can enhance the production of corrosive rust on these steel components.

In order to prevent such oxidation and thereby diminish the amount of rust and other particles the oil 20 in the oil management system 10 is exposed to, oxidation prevention means 140 may comprise, in illustrative embodiments, a blanket of nitrogen 142. As illustrated in FIGS. 14 and 15, the blanket of nitrogen 142 may be pumped into the air space 146 above the oil 20 in the collection sump 26 through a gas tube 150. As nitrogen 142 extends into air space 146, the nitrogen 142 serves to reduce the oxygen content in the air space 146, making the oxygen inert. Rust formation on the steel components of the collection sump 26 is thereby reduced or slowed, decreasing the amount of rust particles 14 or other contaminants the oil 20 is exposed to while in the oil collection sump 26.

Alternatively and in illustrative embodiments, other oxygen scavenging techniques may be used as the oxidation prevention means 140. For instance and as illustrated in FIGS. 16 and 17, an oxygen-scavenging coating 148 may be applied to an inside surface 160 of the side wall 158 of the collection sump 26. The oxygen-scavenging coating 148 may be configured to remove oxygen in the air space 146 and residual dissolved oxygen in the oil 20. In other illustrative embodiments, the oxygen-scavenging coating may be substituted by metal passivation, a process where bare metal surfaces form a protective oxide film to protect the steel from corrosion. Other embodiments are also envisioned that reduce the corrosive effect of oxygen on the metal in the oil management system 10.

Use of the oil filter assembly 11 of the present disclosure, along with the oxidation prevention means 140 to prevent creation of particles such as corrosive rust that can get embedded into the oil 20 as it travels through the oil management system 10, increases the efficiency of removing particles 14 from oil 20 and increases the useful life of the oil management system 10.

Monitoring Sensor

Figure 18:
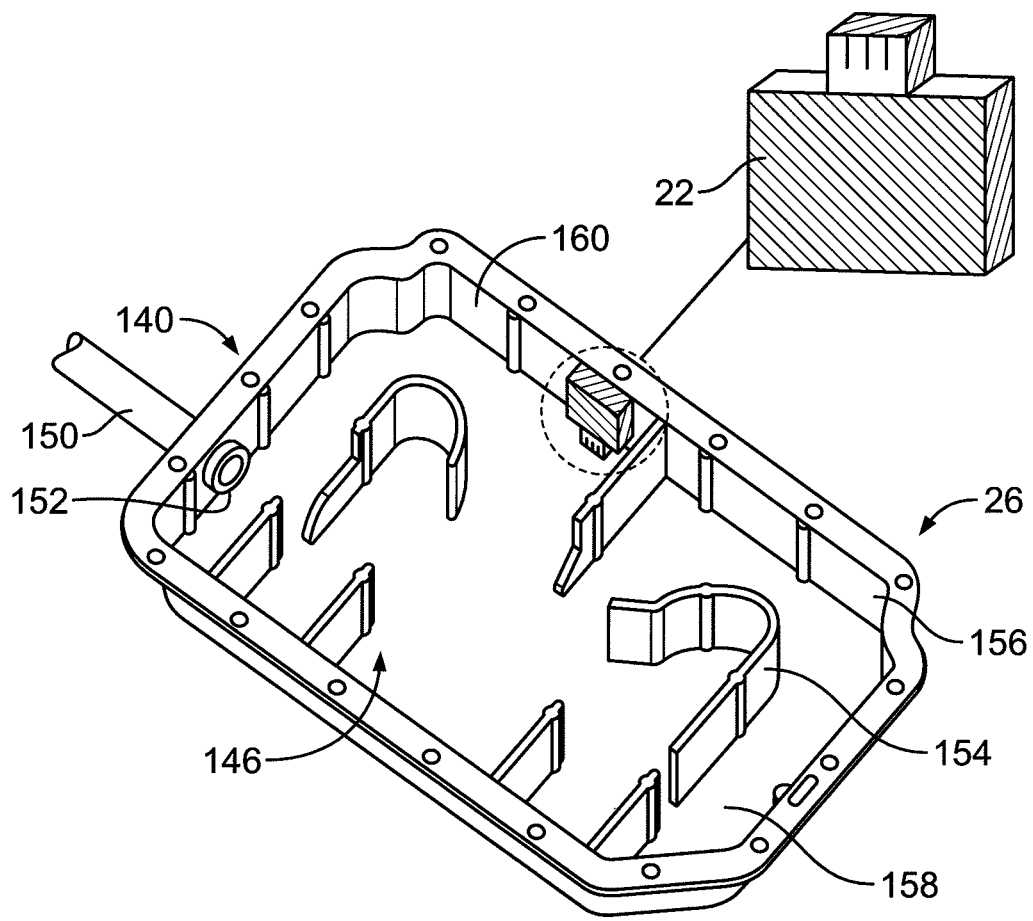
FIG. 18 is a front perspective view of an oil monitoring sensor located on the oil collection sump of FIG. 14.

A further component of the oil management system 10 is the monitoring sensor 22. The monitoring sensor 22 is configured to monitor the condition of the oil 22 and the amount of soot, rust, and other particles 14 in the oil 20 as it is cycled through the oil management system 10. In a non-limiting example and as illustrated in FIGS. 1 and 18, the monitoring sensor may be located on or near the collection sump 26 to monitor the oil 20 on the base 158 of the collection sump 26. The monitoring sensor 22 may be located in other locations, however, as long as it is configured to monitor the oil 22 in the oil management system 10.

The sensor 22 provides several advantages to the oil management system 10. While most vehicle engines 100 presently include a dip stick 102 (as illustrated in FIG. 1) to examine the makeup and consistency of the oil 20 circulating in the engine 100 and to determine whether the filter assembly 11 or oil 20 should be replaced, the sensor 22 provides a more precise and accurate measurement of the particles 14 in the oil 20 than a visual examination of the dip stick 102. The sensor 22 may also be coupled to a display (not shown) in the vehicle to alert the user of the condition of the oil 20 without the need to get out of the vehicle and open the hood.

The sensor 22 may be as intricate or simple as desired. For example, the sensor 22 may measure one or more variables such as the amount of particles 14 per unit of oil 20, the types of particles 14 (soot, rust, organic, or other) in the oil 20, the amount of nitrogen 142 or other oxygen-scavenging material near the oil 20, and/or the flow velocity of oil 20. The sensor 22 could additionally or optionally be configured to measure the current of the electrical field 30 between the electrodes 31, 32 in the filter assembly 11. The sensor 22 could then relay such information to the display to precisely and accurately inform the user of the present condition of the oil 20 in the oil management system 10, thereby increasing the user's ability to respond appropriately to the needs of the oil management system 10.

We claim:

1. An oil management system to reduce and remove an amount of soot, rust or other contaminating particles in an oil used in an engine, the oil management system comprising:
    an oil filter assembly including a housing defining a chamber, the chamber retaining a filter element and an additive cartridge, the additive cartridge including a cartridge housing defining an additive chamber in which an additive is retained, the cartridge housing providing a flow pathway into the additive chamber via an inlet opening formed in the cartridge housing and an flow pathway out of the additive chamber via an outlet opening formed in the cartridge housing in order to continuously disperse a small quantity of the additive into the oil;
    an oxidation prevention means to prevent or diminish oxidation of metal in the oil management system; and
    an oil condition monitoring sensor coupled to an oil collection sump of the engine and separate from the oil filter assembly, the oil condition monitoring sensor configured to measure at least one parameter selected from the group consisting of an amount of rust particles per unit of oil, an amount of nitrogen in the sump, and an amount of oxygen-scavenging material in the sump.

2. The oil management system of claim 1, wherein the filter element includes a mechanical filter member comprising a porous material in which a portion of the particles are filtered out of the oil.

3. The oil management system of claim 1, wherein the filter element includes a centrifuge member having an outer peripheral surface.

4. The oil management system of claim 3, wherein the centrifuge member creates a centrifugal force on the oil within the filter element to cause the particles in the oil to move to the outer periphery surface.

5. The oil management system of claim 4, wherein the outer peripheral surface is removable from the filter element.

6. The oil management system of claim 3, wherein the filter element includes a mechanical filter member.

7. The oil management system of claim 1, wherein the filter element includes a means for creating an electrical field inside the filter element that causes the particles to agglomerate together in the oil.

8. The oil management system of claim 7, wherein the means includes a positive electrode and a negative electrode and the agglomerated particles are attracted to the positive electrode.

9. The oil management system of claim 8, wherein the filter element also includes a centrifuge member.

10. The oil management system of claim 9, wherein an outer periphery of the centrifuge member is a positive electrode that forms a portion of the means for producing the electrical field.

11. The oil management system of claim 1, wherein the additive cartridge housing includes a shroud over the outlet opening that provides an iso-static pressure region adjacent the outlet opening.

12. The oil management system of claim 11, wherein the shroud includes one or more openings that reduce pressure imbalance between the additive chamber and an area outside of the additive cartridge.

13. The oil management system of claim 1, wherein the inlet opening is located below a top edge of the cartridge housing.

14. The oil management system of claim 1, wherein the inlet opening and outlet opening are formed as part of an integral one-piece structure.

15. The oil management system of claim 1, wherein the flow pathway into the additive chamber includes a discharge port between the inlet opening and the additive chamber, the discharge port located in an air pocket above the additive in the additive chamber.

16. An oil management system to reduce and remove an amount of soot, rust or other contaminating particles in an oil used in an engine, the oil management system comprising:
    an oil filter assembly including a housing defining a chamber, the chamber retaining a filter element and an additive cartridge, the additive cartridge including a cartridge housing defining an additive chamber in which an additive is retained, the cartridge housing providing a flow pathway into the additive chamber via an inlet opening formed in the cartridge housing and a flow pathway out of the additive chamber via an outlet opening formed in the cartridge housing in order to continuously disperse a small quantity of the additive into the oil;
    an oil collection sump, the oil collection sump configured to collected used oil from the engine, the oil collection sum including an oxidation prevention means to prevent or diminish oxidation of metal in the oil collection sump; and
    an oil condition monitoring sensor coupled to the oil collection sump and separate from the oil filter assembly, the oil condition monitoring sensor configured to measure at least one parameter selected from the group consisting of an amount of rust particles per unit of oil, an amount of nitrogen in the SUMP, and an amount of oxygen-scavenging material in the sump.

17. The oil management system of claim 16, wherein the oxidation prevention means includes a blanket of nitrogen above the oil in the oil collection sump.

18. The oil management system of claim 17, wherein the nitrogen is configured to be located in an air space above the oil in the oil collection sump.

19. The oil management system of claim 18, wherein the nitrogen is pumped into the oil collection sump through a tube connected to the oil collection sump.

20. The oil management system of claim 16, wherein the oxidation prevention means includes an oxygen-scavenging coating.

21. The oil management system of claim 20, wherein the oxygen-scavenging coating includes nitrogen.

22. The oil management system of claim 16, wherein the oxidation prevention means includes metal passivation.

23. The oil management system of claim 22, wherein the metal passivation includes an oxide film.

24. A method for removing soot, sludge, and other insoluble particles from oil circulating through an oil management system in a vehicle, the oil containing a fully or partially formed additive package, the method comprising:
    moving the oil through an oil filter assembly, the oil filter assembly including a filter element and an additive cartridge;
    exposing components of the oil management system to an oxidation prevention means to prevent or diminish oxidation of metal in the oil management system; and
    monitoring the condition of the oil with a sensor coupled to the oil collection sump and separate from the oil filter assembly, to measure at least one parameter selected from the group consisting of an amount of rust particles per unit of oil, an amount of nitrogen in the SUMP, and an amount of oxygen-scavenging material in the sump.

25. The method of claim 24, wherein the filter element includes a mechanical filter member with porous material capturing a portion of the particles and a pair of electrodes generating an electrical field to cause a portion of the particles to agglomerate on the positive electrode.

26. The method of claim 25, wherein the method also includes applying a centrifugal to cause a portion of the particles to move toward the positive electrode.

27. The method of claim 24, wherein the method also includes continuously dispersing a small quantity of additive into the oil from the additive cartridge.

28. The method of claim 27, wherein the oil is configured to flow through the additive cartridge after it flows through the filter element in the filter assembly.

29. The method of claim 24, wherein the exposing and monitoring occur in the same component of the oil management system.

* * * * *